(12) United States Patent
Kleiner

(10) Patent No.: US 11,738,394 B2
(45) Date of Patent: Aug. 29, 2023

(54) HYDRAULIC EXPANDING CHUCK

(71) Applicant: Guehring KG, Albstadt (DE)

(72) Inventor: Gilbert Kleiner, Inzigkofen (DE)

(73) Assignee: Guehring KG, Albstadt (DE)

(*) Notice: Subject to any disclaimer, the term of this patent is extended or adjusted under 35 U.S.C. 154(b) by 7 days.

(21) Appl. No.: 17/181,032

(22) Filed: Feb. 22, 2021

(65) Prior Publication Data

US 2021/0323078 A1  Oct. 21, 2021

Related U.S. Application Data

(63) Continuation of application No. PCT/EP2019/072495, filed on Aug. 22, 2019.

(51) Int. Cl.
    *B23B 31/30* (2006.01)

(52) U.S. Cl.
    CPC .......... *B23B 31/305* (2013.01); *B23B 31/302* (2013.01)

(58) Field of Classification Search
    CPC ............... B23B 31/305; B23B 31/1172; B23B 31/1178; B23B 31/302; Y10T 279/1241; Y10T 279/1216
    See application file for complete search history.

(56) References Cited

U.S. PATENT DOCUMENTS

| | | | |
|---|---|---|---|
| 10,821,523 B2 * | 11/2020 | Wagner | B23B 31/261 |
| 2007/0145692 A1 | 6/2007 | Herud | |
| 2011/0175300 A1 * | 7/2011 | Schuffenhauer | B23B 31/305 |
| | | | 279/4.06 |
| 2016/0193666 A1 * | 7/2016 | Haimer | B23B 31/02 |
| | | | 219/121.64 |
| 2022/0152710 A1 * | 5/2022 | Matheis | B23B 31/005 |

FOREIGN PATENT DOCUMENTS

| | | | |
|---|---|---|---|
| DE | 102010008872 A1 * | 8/2011 | ........... B23B 31/261 |
| EP | 1 737 594 B1 | 1/2007 | |
| JP | S57-96705 A | 6/1982 | |
| JP | S61-90843 A | 5/1986 | |
| JP | S61-144928 U | 9/1986 | |
| WO | 98/39123 A1 | 9/1998 | |

OTHER PUBLICATIONS

Machine Translation, JP 61090843A. (Year: 1986).*
DPMAregister Print Out dated Mar. 1, 2021.
International Search Report and Written Opinion (Application No. PCT/EP2019/072495) dated Nov. 25, 2019 (with English translation).

* cited by examiner

*Primary Examiner* — Eric A. Gates
(74) *Attorney, Agent, or Firm* — Brown & Brown IP Law PLLC

(57) ABSTRACT

A hydraulic expanding chuck for receiving and clamping a tool with a shank. The hydraulic expanding chuck has a main body, which on an axial side has a clamping section that extends along a longitudinal central axis of the expanding chuck and has a clamping part lying in a neck region and in which are formed a central receiving opening for receiving a tool shank and a chamber system to which a fluid pressure can be applied. The chamber system comprises at least one pressure chamber, which is separated from the receiving opening in the radial direction by an expansion wall yielding elastically under the fluid pressure, and which can be supplied with fluid pressure by means of at least one axial pressure channel running from a piston clamping mechanism accommodated in a clamping region of the hydraulic expanding chuck.

13 Claims, 5 Drawing Sheets

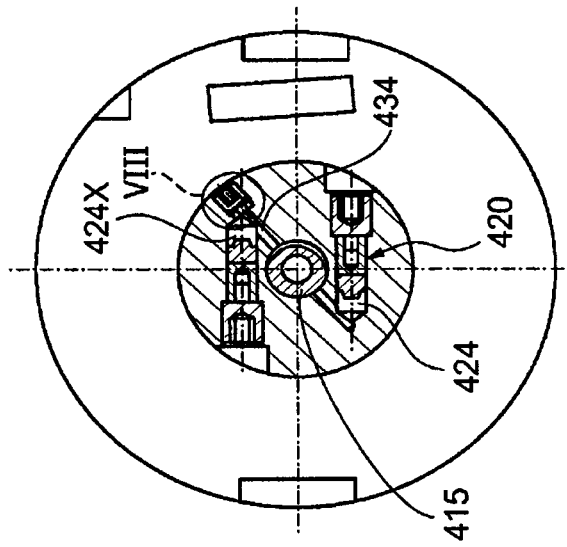
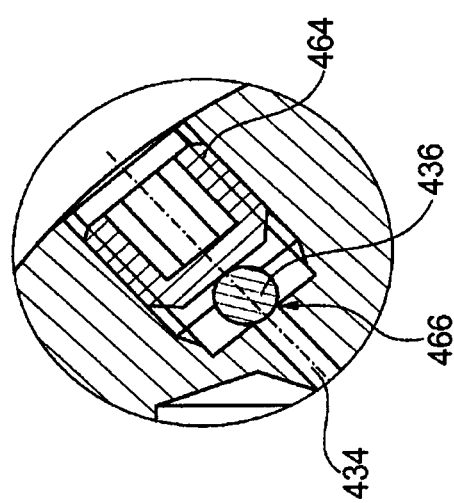
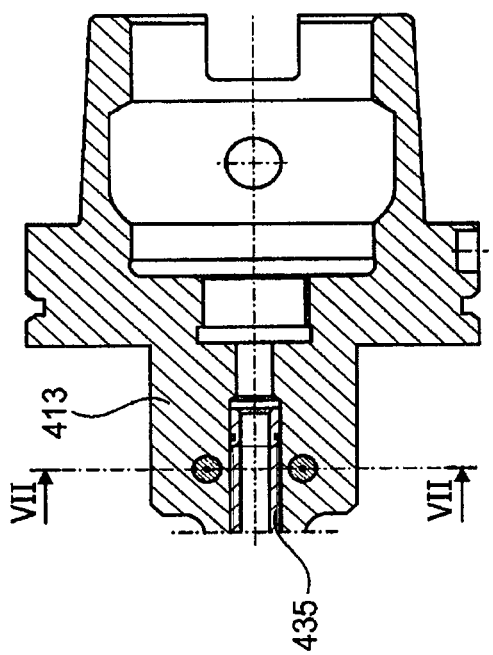

HYDRAULIC EXPANDING CHUCK

TECHNICAL FIELD

The invention relates to a hydraulic expanding chuck for receiving and clamping a shank tool.

For example, generic hydraulic expanding chucks are known from documents WO 98/39123 or EP 1 737 594 B1. The compressive force generated by the piston clamping mechanism is here relayed to a single- or multi-chamber system via at least one axial pressure channel. Also provided is a filling and venting channel system, which is hooked up to the at least one pressure channel, and hermetically sealed to the outside after filling and venting.

It has been shown that such hydraulic expanding chucks are able to clamp tools with enough clamping force with good centricity. However, in particular when such hydraulic expanding chucks must be given an especially narrow design, so that the neck region receives an axial extension corresponding to a multiple of its diameter, the problem arises that it becomes difficult to keep the concentricity of the clamped tool within the specified tolerance zone.

Therefore, the object of the invention is to create a hydraulic expanding chuck of the kind described at the outset, with which even tools with a small diameter or tools that must be clamped in especially narrow hydraulic expanding chucks can be reliably clamped with an improved concentricity.

This object is achieved by the present invention.

The invention is based on the following determinations. In a known hydraulic expanding chuck, for example of the kind schematically depicted on FIGS. 12 and 13, to which reference is already made here, and marked with reference number 10, the piston clamping mechanism marked 20 is located in a clamping plane marked ES standing perpendicular on a longitudinal central axis 2. The clamping plane ES lies in a clamping region 13 of a clamping section 14, which is arranged on an axial side of a main body 12, extends along the longitudinal expanding chuck 10, and has a clamping part 18 lying in a neck region 16 having a diminished diameter relative to the clamping region 13. The clamping part 18 incorporates a central receiving opening 22 for receiving a tool shank and a chamber system not shown or marked in more detail that can be supplied with a fluid pressure. A shank part 40 lies on the other axial side of the main body 12, and for example has an HSK (hollow shank taper) shank for coupling to a module (not shown) of a modular tool system or to a machine spindle.

The chamber system is formed in a sleeve-like insert marked 15, which is fitted into a bore 42 of the clamping section 14. The chamber system has at least one pressure chamber or clamping membrane chamber, which is separated from the receiving opening 22 in a radial direction by a membrane or expansion wall yielding elastically under the fluid pressure, and can be supplied with fluid pressure via at least one axial pressure channel (likewise not shown and marked in any more detail). This pressure channel is communicatively connected with the piston clamping mechanism 20, more precisely with a pressure generating chamber 24, which is delineated by a pressure piston 28 guided with fit in a bore 26. A sealing body 29 consisting of elastic material, e.g., high-strength plastic or rubber, is inserted between the pressure piston 28 and pressure generating chamber 24 under an elastic prestress. The pressure piston 28 can be activated via an adjusting screw 30, which sits in a threaded bore 32 that axially adjoins the bore 26.

A filling and venting bore 34 is also communicatively connected with the fluid or hydraulic chamber system of the clamping assembly, and can be locked by means of a closure body 36. Used in the known case, for example, is a pressure screw 38, which presses the closure body 36 against a seat not marked in any more detail.

As evident from the illustration according to FIGS. 12 and 13, the piston clamping mechanism 20 along with the filling and venting bore 34 are arranged in such a way that the respective axes A20 and A34 lie outside of the longitudinal central axis 2.

Studies have shown that this configuration is responsible for a systematic concentricity error, which increases as the axial overall length of the clamping section 14 or neck region 16 becomes longer, and the clamping force built up by the piston clamping mechanism 20 becomes higher. It was specifically recognized that the asymmetrical cross sectional configuration of the clamping section 14 in the region of the clamping plane ES yields a significant a nonuniform radial deformation of the clamping section 14 in this area, which ultimately results in concentricity errors on the cutters of the tool that are no longer acceptable. The fact that the clamping pressures generatable by the piston clamping mechanism 20 now lie at an order of magnitude of 1500 bar also plays a role in this, in particular given hydraulic expanding chucks with a slender design, i.e., for clamping tools with small diameters. The neck region 16 radially swerves to such an extent given a conventional configuration and stress for the recesses in the clamping section 14 that concentricity errors of up to 10 µm are measured on the tool.

Configuring the hydraulic expanding chuck according to the features of claim 1 eliminates this system-related concentricity error described above at the crucial location with the least possible effort. The fluid pressure-related deformations and/or distortions in the clamping region of the hydraulic expanding chuck induced by a pressure buildup while clamping the tool are now superposed based on the mutual adjustment and positioning of the recesses and cavities lying in this region in such a way that the longitudinal central axis of the neck region remains largely in alignment with the longitudinal central axis of the expanding chuck. The geometry of the recesses in the clamping region thus no longer affects the concentricity of the tool, not even if extremely high fluid pressures are used given very narrow and/or long hydraulic expanding chucks.

Advantageous further developments are the subject of the subclaims.

The recesses lying in the clamping region are preferably adjusted and positioned according to the invention by computer. The recesses can here be offset relative to each other not just in the circumferential direction, but also in an axial direction, and be assigned predetermined sizes and positions. An especially simple production is allowed by the further development according to claim 2, in which the coordination of recess distribution is essentially confined to one plane.

In the simplest form of the inventive configuration of the recesses in the clamping region, the latter are designed point-symmetrically, most easily in such a way that the cross section receives a bidentate rotational symmetry. In this case, a bore for receiving a pressure piston for pressure generation is placed opposite a compensation bore that is point-symmetrical thereto, in which pressure conditions comparable to the region of the pressure piston prevail at comparable positions. It is here not necessary that a piston be received in this compensation bore for pressure buildup purposes. This case can also involve merely a point-symmetrically configured "dummy" bore, which receives a piston for limiting a pressure chamber, which is hooked up to a fluid pressure carrying line.

The special advantage to the concept according to the invention is that no change is required in the basic structural design of the clamping assembly of conventional hydraulic expanding chucks. The further development according to claims 4 to 7 thus yields a hydraulic expanding chuck that is especially economical to manufacture.

The features in claim 6 here yield an especially advantageous further development. Let it be emphasized at this juncture that this variant for blocking the filling and venting bore is regarded as an independent invention, and the applicant reserves the right to claim independent protection for it. According to the above, the at least one filling and vent bore can be blocked by means of a closure body that can be pressed against a closure seat while exposed to the clamping pressure generated by the piston clamping mechanism.

The advantages to the configuration of the hydraulic expanding chuck described above basically do not depend on the central axes of the fluid-filled recesses lying in one plane in the clamping region. It is only crucial that these recesses lie in such a way that an n-count rotational symmetry be provided in all cross sections of the clamping region lying perpendicular to the longitudinal central axis. However, it becomes especially simple to manufacture the hydraulic expanding chuck when—according to claim 6—the piston clamping mechanism and possibly also the at least one filling and venting bore lie essentially in a clamping plane perpendicular to the longitudinal central axis. Let it be emphasized at this juncture, however, that the at least one filling and venting bore can of course also have an axial component.

The benefits to the new configuration of the hydraulic expanding chuck become all the more tangible the narrower the design of the hydraulic expanding chuck, meaning for example when the clamping region receives a diameter that essentially corresponds to a multiple of the diameter of the neck region, and/or when the length of the neck region corresponds to a multiple, preferably to at least three times, the diameter of the neck region.

Embodiments of the invention will be described in more detail below based on schematic drawings.

Shown on:

FIG. 6 is a partial view of a fourth embodiment of the hydraulic expanding chuck;

FIG. 7 is the section VII-VII on FIG. 6;

FIG. 8 is a magnified view of detail VIII on FIG. 7;

Figures 12, 13:
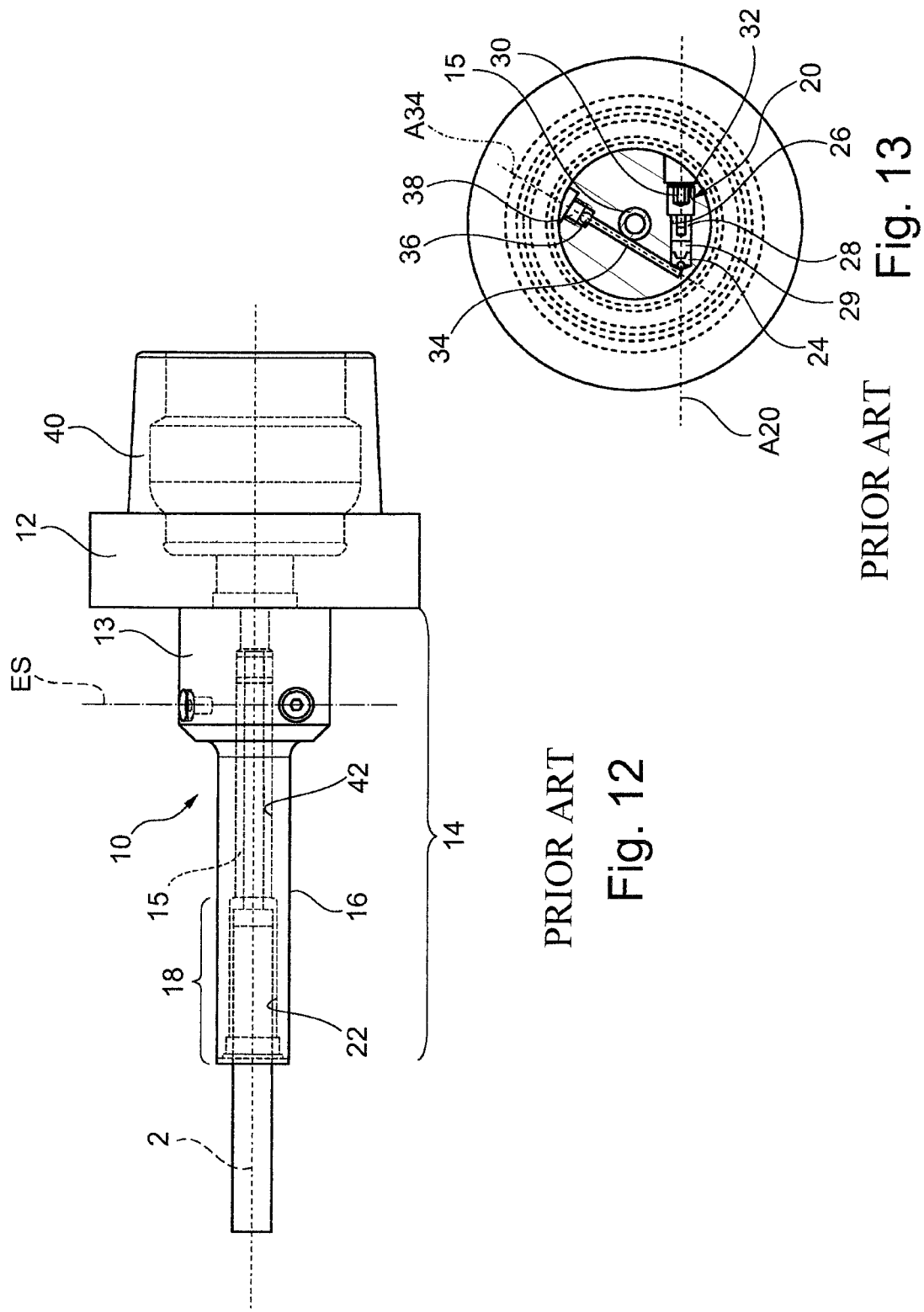
FIG. 12 is a schematic side view of a known hydraulic expanding chuck.
FIG. 13 is a schematic section through the hydraulic expanding chuck according to FIG. 12 in the clamping plane ES.

To simplify the description, those structural elements that correspond to the components of known hydraulic expanding chucks according to FIGS. 12 and 13 are provided with similar reference numbers, but preceded by a number "1", "2", "3", "4" or "5".

First Exemplary Embodiment

Figure 1:
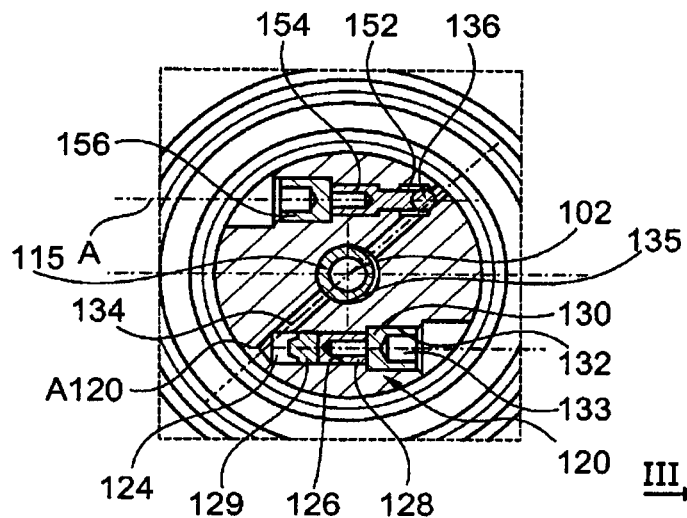
FIG. 1 is a sectional view in the clamping region of a first variant of the hydraulic expanding chuck.

In an illustration similar to FIG. 13, FIG. 1 shows the section perpendicular a longitudinal central axis 102 in the clamping region, more precisely in the clamping plane ES of a hydraulic expanding chuck. The piston clamping mechanism marked 120 has a pressure generating chamber 124 bounded by a pressure and sealing body 139, wherein a pressure piston 128 guided with fit in a bore 126 is located axially behind the pressure and sealing body 139. The pressure piston 128 can be activated via an adjusting screw 130, which rests in a threaded bore 132 axially adjoining the bore 126. The adjusting screw has a Torx or Allen recess 133 for its activation.

The pressure generating chamber 124 is communicatively connected with the no longer depicted chuck chamber system, wherein an axially running pressure channel 135 is provided for this purpose. In the exemplary embodiment shown, the pressure channel 135 is formed by a coiled groove in the outer surface of the sleeve-like insert 115. Instead of or in addition to this coiled groove 135, a coiled groove can also be formed in the receiving bore 142 for the insert 115. The coiled groove can also have a multi-start design. In the simplest configuration, the coiled groove is designed like a thread.

The filling and venting bore 134 lying diametrically opposite in this embodiment is likewise communicatively connected with the fluid or hydraulic chamber system of the chamber assembly, and can be locked by means of a closure body in the form of a closure ball 136.

In order to achieve deformations of the clamping region of the hydraulic expanding chuck that are evened out over the circumference, the recesses required for the piston clamping mechanism 120 and the filling and venting assembly are placed and designed in such a way as to yield a cross section in the clamping region that has an n-count rotational symmetry. The depicted exemplary embodiment according to FIG. 1 involves a 2-count rotational symmetry, i.e., the recesses are point symmetrical in design relative to the longitudinal central axis 102.

To this end, the closure ball 136 lies in a chamber 152 that lies and is configured point symmetrically to the pressure generating chamber 124. The closure ball is pressed against a closure seat (not marked) by means of a pressure body 154, specifically by means of a pressure screw 156, whose threaded bore lies and is configured point symmetrically to the threaded bore 132. The longitudinal axis A of the stepped bore for receiving the pressure screw 156 and the pressure body 154 is parallel to the axis A120 of the piston clamping mechanism 120, thereby yielding a Z-shape that captures longitudinal central axis 102 for the recesses in cross section.

As a clamping pressure builds up in the pressure generating chamber 124, this pressure thus expands via the filling and venting bore 134 into the chamber 152, which is essentially adjusted geometrically to the pressure generating chamber 124. Since the totality of recesses in the clamping region have a point symmetrical configuration, and the chambers that can be supplied with a fluid pressure are uniformly distributed over the circumference, the clamping region of the hydraulic expanding chuck is no longer subject to any unsymmetrical deformation even at the highest fluid pressures, so that no system-related concentricity errors arise on the tool.

In this embodiment, the clamping region, i.e., the region in which the piston clamping mechanism 120 is accommodated, is thus configured and/or machined in such a way that the recesses and cavities lying in this region are positioned relative to each other and/or distributed around the circumference in a manner that deformations and/or distortions in the clamping region induced by a pressure buildup while clamping the tool become superposed, such that the longitudinal central axis of the neck region 116 remains largely in alignment with the longitudinal central axis 102 of the expanding chuck.

The peculiarity of the embodiment according to FIG. 1—which is regarded as a separate invention—still lies in the fact that the closure ball 136 is pressed against a closure seat with a force component radially directed from the inside out, wherein the fluid pressure building up in the filling and venting bore 134 supports the sealing function.

Second Embodiment

Figure 2:
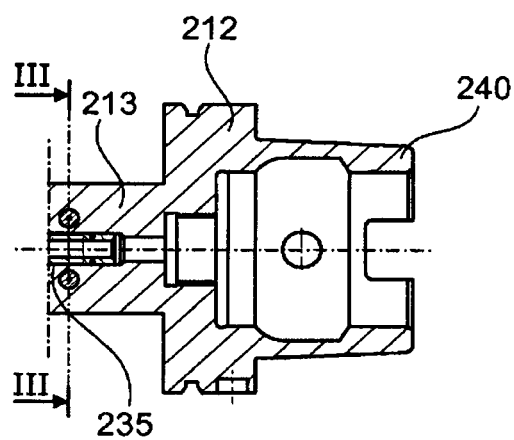
FIG. 2 is a partial section of a modified embodiment of the hydraulic expanding chuck.

A second embodiment will be described with reference to FIGS. 2 to 4, which differs from the embodiment according to FIG. 1 mainly in that another form of sealing a filling and venting bore 234 is selected, thus providing the clearance for configuring a second piston clamping mechanism 220X.

Figure 3:
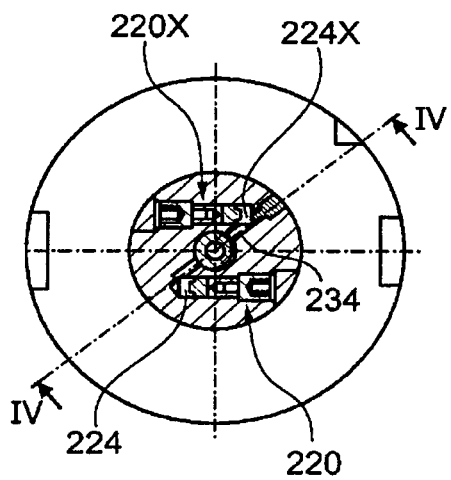
FIG. 3 is the section III-III on FIG. 2.
Figure 4:
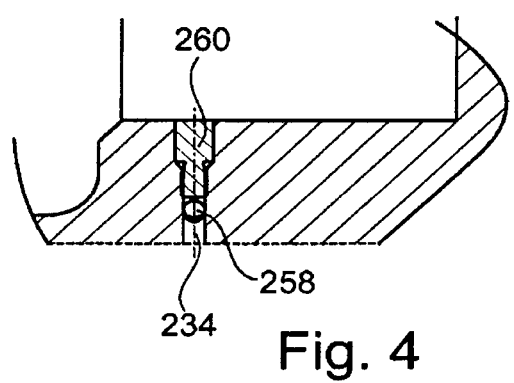
FIG. 4 is a magnified view of a partial sectional view according to IV-IV on FIG. 3 rotated by 50°.

As evident from the illustration on FIG. 3, another piston clamping mechanism 220X is formed point symmetrically to the piston clamping mechanism 220, wherein the two pressure generating chambers 224 and 224X are connected in terms of flow via the filling and venting bore 234. As with the embodiment described above, the pressure chamber (not shown in any more detail) of the hydraulic expanding chuck is supplied via a male thread 235 of the insert 215.

The filling and venting bore 234 is sealed to the outside by a soldered-in copper body 258, which serves as a safety feature for the one screw plug 260.

Third Embodiment

Figure 5:
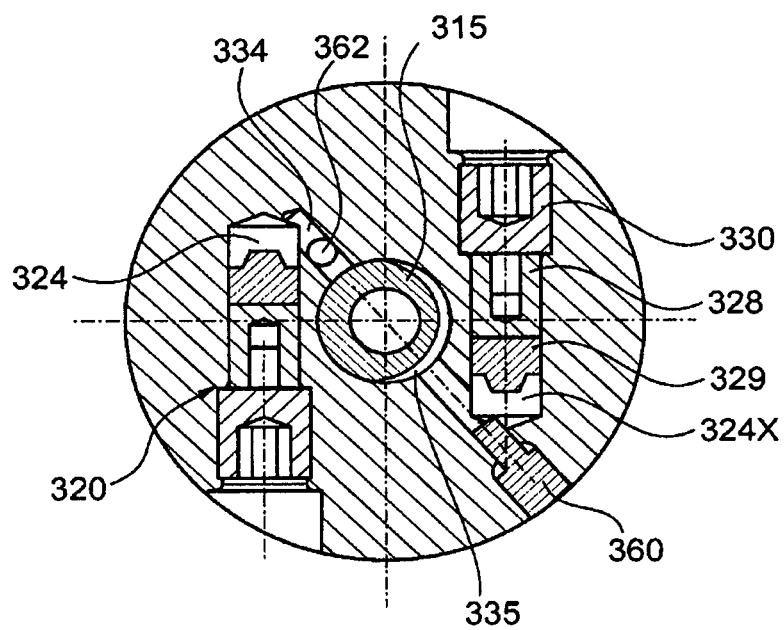
FIG. 5 is a view of a third embodiment of the hydraulic expanding chuck similar to FIG. 1.

The third embodiment shown on FIG. 5 essentially corresponds to the second embodiment, wherein at least one axially running pressure channel 362 leading to a no longer depicted clamping membrane chamber is shown, which branches away from the filling and venting bore 334. In this case, the male thread 335 on the insert 315 can be omitted.

Fourth Embodiment

Described based on FIGS. 6 to 8 is a fourth embodiment, which only differs from the third embodiment in that the filling and venting bore 434 is closed in a modified way. Used for this purpose is a ball 436, which is pressed against a closure seat 466 by a grub screw 464 equipped with a recess for a tool.

Fifth Embodiment

Figure 9:
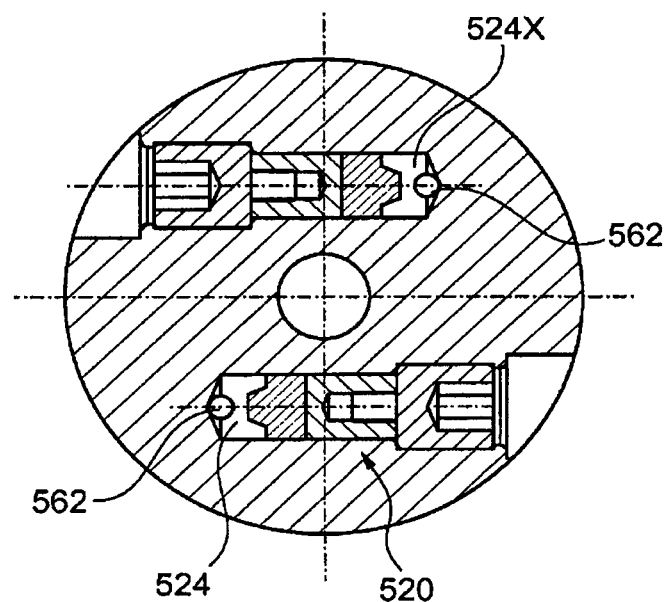
FIG. 9 is a view of the fifth embodiment of the hydraulic expanding chuck similar to FIG. 5.
Figure 10:
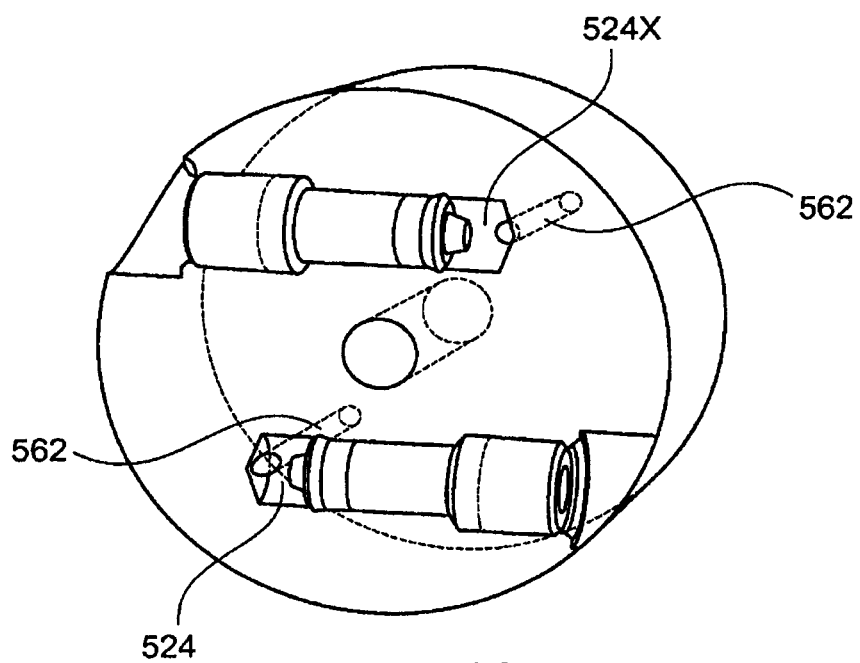
FIG. 10 is a perspective view of the clamping region of the variant according to FIG. 9.

The fifth embodiment to be described based on FIGS. 9 and 10 essentially corresponds to the third embodiment, the difference being that the pressure generating chambers 524 and 524X are not coupled with each other via a diametrically guided filling and venting bore, but via axially running pressure channels 562.

In summary, it should thus be noted that the peculiarity of the hydraulic expanding chuck lies in the fact that, at least in the region in which the piston clamping mechanism is accommodated, the clamping section of the hydraulic expanding chuck is configured and/or machined in such a way that the recesses and cavities lying in this region are positioned relative to each other and/or distributed over the circumference so that deformations and/or distortions induced by a pressure buildup while clamping the tool become superposed in the clamping region in such a way that the longitudinal central axis of the neck region remains largely in alignment with the longitudinal central axis of the expanding chuck. A variant that is especially easy to manufacture provides that the cross section perpendicular to the longitudinal central axis, preferably in all sectional planes, has essentially an n-count rotational symmetry, wherein n is a whole number $\geq 2$, and the cavities filled with hydraulic fluid are uniformly distributed over the circumference.

Figure 11:
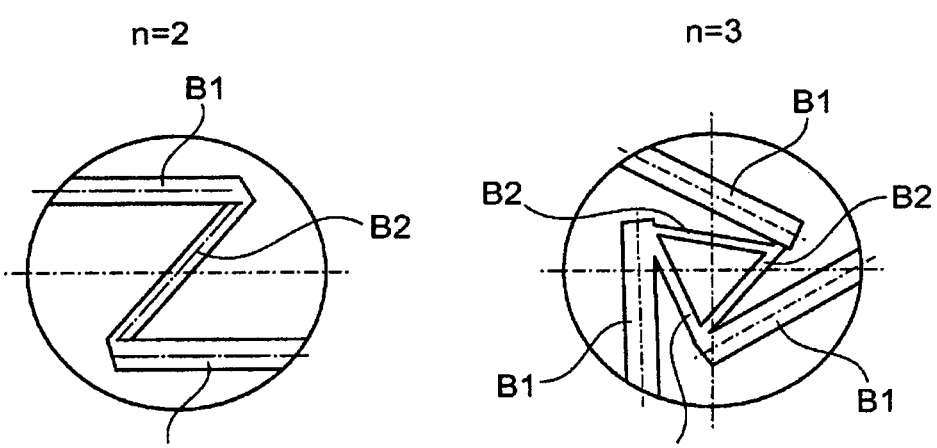
FIG. 11 is a schematic illustration to explain the inventive concept for configuring the clamping region of a hydraulic expanding chuck according to the invention.

This rotational symmetry was described above for n=2. Shown schematically on FIG. 11 is how a cross sectional configuration looks for n=3. All recesses in the clamping region of the hydraulic expanding chuck, i.e., bores B1 for the pressure piston and bores B2 for the configuration of the filling and venting channels are placed in such a way as to yield a three-digit rotational symmetry. Furthermore, all chambers filled with pressure fluid are essentially uniformly distributed over the circumference.

When reference is made above to rotational symmetry, it means that a mathematically exact rotational symmetry is here not required. It has been shown that the inventive effects of stabilizing a longitudinal central axis 2 of the neck region are only slightly diminished when angular deviations in symmetry ranging from 10 to 15° are present.

Embodiments having two pressure generating chambers were described above based on FIGS. 2 to 10. However, it is also possible to deactivate one of the pressure generating chambers without diminishing the effect of the invention.

The invention thus provides hydraulic expanding chucks for receiving and clamping a shank tool, with a main body that on an axial side carries a clamping section which extends along a longitudinal central axis of the expanding chuck and has a clamping part lying in a neck region, in which are formed a central receiving opening (122) for receiving a tool shank and a chamber system that can be supplied with a fluid pressure. The chamber system comprises at least one pressure chamber, which in a radial direction is separated from the receiving opening by an expansion wall yielding elastically under the fluid pressure and can be supplied with fluid pressure via at least one axial pressure channel, which proceeds from a piston clamping mechanism accommodated in a clamping region of the hydraulic expanding chuck. In order to eliminate system-related concentricity errors, at least in the region that accommodates the piston clamping mechanism, the clamping section is configured and/or machined in such a way that the recesses and cavities lying in this region are positioned relative to each other and/or distributed over the circumference so that deformations and/or distortions induced by a pressure buildup while clamping the tool become superposed in the clamping region in such a way that the longitudinal central axis (2) of the neck region remains largely in alignment with the longitudinal central axis (2) of the expanding chuck.

The invention claimed is:

1. A hydraulic expanding chuck for receiving and clamping a tool shank, comprising:
a main body;
a clamping section that extends along a longitudinal central axis of the expanding chuck, the clamping section having a clamping part lying in a neck region, in which are formed a central receiving opening for receiving the tool shank and a chamber system that can be supplied with a fluid pressure, the chamber system comprising at least a first pressure chamber, which in a radial direction is separated from the receiving opening by an expansion wall yielding elastically under the fluid pressure and which can be supplied with the fluid pressure via at least a first axial pressure channel, which proceeds axially from a piston clamping mechanism accommodated in a clamping region of the hydraulic expanding chuck, the first axial pressure channel being spaced radially from the longitudinal central axis by a first distance that is farther than a distance that the first pressure chamber is spaced radially from the longitudinal central axis, wherein, at least in the region that accommodates the piston clamping mechanism, the clamping section is configured and/or machined in such a way that recesses and cavities lying in the region that accommodates the piston clamping mechanism are positioned relative to each other and/or distributed over the circumference so that deformations and/or distortions induced by a pressure buildup while clamping the tool become superposed in the clamping region in such a way that the longitudinal central axis of the neck region remains largely in alignment with the longitudinal central axis of the expanding chuck.

2. The hydraulic expanding chuck according to claim 1, wherein, at least in the region that accommodates the piston clamping mechanism, the clamping section is configured and/or machined in such a way that the cross section perpendicular to the longitudinal central axis has essentially an n-count rotational symmetry, wherein n is a whole number ≥2, and the cavities filled with hydraulic fluid are uniformly distributed over the circumference.

3. The hydraulic expanding chuck according to claim 1, wherein, in the region that accommodates the piston clamping mechanism, the clamping region is configured and/or machined in such a way that the cross section perpendicular to the longitudinal central axis has essentially a point symmetry.

4. The hydraulic expanding chuck according to claim 3, wherein, at least in the region that accommodates the piston clamping mechanism, the clamping section is configured and/or machined in such a way that the cross section perpendicular to the longitudinal central axis has essentially an n-count rotational symmetry, and n=2.

5. The hydraulic expanding chuck according to claim 1, wherein the piston clamping mechanism has at least one bore for a sealed reception of a pressure piston that borders a pressure generating chamber and can be axially displaced by an allocated adjusting screw for building up a clamping pressure.

6. The hydraulic expanding chuck according to claim 5, wherein the pressure generating chamber is hooked up to at least one filling and venting bore that can be sealed fluid tight.

7. The hydraulic expanding chuck according to claim 6, wherein the at least one filling and venting bore can be locked by at least one closing body, which can be pressed against a closure seat under the influence of the clamping pressure generated by the piston clamping mechanism.

8. The hydraulic expanding chuck according to claim 1, wherein the piston clamping mechanism lies essentially in a clamping plane perpendicular to the longitudinal central axis.

9. The hydraulic expanding chuck according to claim 8, wherein at least one filling and venting bore lies essentially in the clamping plane.

10. The hydraulic expanding chuck according to claim 1, wherein the clamping region has a diameter that essentially corresponds to a multiple of a diameter of the neck region.

11. The hydraulic expanding chuck according to claim 10, wherein the length of the neck region corresponds to a multiple of the diameter of the neck region.

12. The hydraulic expanding chuck according to claim 10, wherein the length of the neck region corresponds to a multiple of at least three times the diameter of the neck region.

13. The hydraulic expanding chuck according to claim 1, wherein a shank part for coupling the hydraulic expanding chuck to a module of a modular tool system or to a machine spindle is fastened to the main body on a side facing away from the clamping region.

* * * * *